United States Patent
Li et al.

(10) Patent No.: US 7,650,637 B2
(45) Date of Patent: Jan. 19, 2010

(54) SYSTEM FOR ENSURING QUALITY OF SERVICE IN A VIRTUAL PRIVATE NETWORK AND METHOD THEREOF

(75) Inventors: Defeng Li, Guangdong Province (CN); Guoping Li, Guangdong Province (CN); Bin Li, Guangdong Province (CN)

(73) Assignee: Hua Wei Technologies Co., Ltd., Shenzhen (CN)

( * ) Notice: Subject to any disclaimer, the term of this patent is extended or adjusted under 35 U.S.C. 154(b) by 437 days.

(21) Appl. No.: 10/586,604

(22) PCT Filed: Jan. 12, 2005

(86) PCT No.: PCT/CN2005/000037

§ 371 (c)(1), (2), (4) Date: Jul. 20, 2006

(87) PCT Pub. No.: WO2005/101730

PCT Pub. Date: Oct. 27, 2005

(65) Prior Publication Data

US 2008/0172732 A1    Jul. 17, 2008

(30) Foreign Application Priority Data

Jan. 20, 2004    (CN)    .................. 2004 1 0002614

(51) Int. Cl.
*H04L 29/00* (2006.01)
(52) U.S. Cl. .................. 726/15; 370/229; 370/389; 370/409
(58) Field of Classification Search .................. 726/15; 370/229, 389, 409
See application file for complete search history.

(56) References Cited

U.S. PATENT DOCUMENTS 6,363,053 B1 * 3/2002 Schuster et al. ............. 370/230

(Continued)

FOREIGN PATENT DOCUMENTS

CN    1321025    11/2001

(Continued)

OTHER PUBLICATIONS

Supplementary European Search Report issued in corresponding European Patent Application No. EP 05 70 0411, dated Jan. 15, 2007.

(Continued)

*Primary Examiner*—Carl Colin
*Assistant Examiner*—Ghazal Shehni
(74) *Attorney, Agent, or Firm*—Slater & Matsil, L.L.P.

(57) ABSTRACT

A system for ensuring quality of service (QoS) in a virtual private network and a method thereof are provided. The system includes a logical bearer network, which is formed by connecting label switch paths configured with preserving bandwidth to routers, and is dedicated to transmit QoS service data; and a bearer control network, which is used to maintain logical bearer network, allocate route, mark service priority, and route service data to opposite end. The method includes the steps of: A. constructing a logical bearer network to transmit QoS service data by configuring label switch paths with preserved bandwidth; B. providing a centralized resource controller to manage resources of the logical bearer network; C. if QoS service data is to be transmitted, marking service priority in QoS field of the routing labels of multi-protocol label switch data packets, and routing service data to the opposite end.

15 Claims, 4 Drawing Sheets

U.S. PATENT DOCUMENTS

| | | | |
|---|---|---|---|
| 6,493,349 B1* | 12/2002 | Casey | 370/409 |
| 6,882,643 B1* | 4/2005 | Mauger et al. | 370/389 |
| 6,886,043 B1 | 4/2005 | Mauger et al. | |
| 6,912,232 B1* | 6/2005 | Duffield et al. | 370/468 |
| 6,967,954 B2 | 11/2005 | Sugiyama | |
| 2002/0114274 A1* | 8/2002 | Sturges et al. | 370/229 |
| 2003/0103510 A1* | 6/2003 | Svanberg et al. | 370/395.2 |
| 2003/0117954 A1 | 6/2003 | De Neve et al. | |
| 2003/0204596 A1* | 10/2003 | Yadav | 709/226 |
| 2004/0156313 A1* | 8/2004 | Hofmeister et al. | 370/229 |
| 2005/0160171 A1* | 7/2005 | Rabie et al. | 709/227 |

FOREIGN PATENT DOCUMENTS

| | | |
|---|---|---|
| CN | 1449162 A | 10/2003 |
| EP | 1 187 405 A1 | 3/2002 |
| EP | 1294202 * | 3/2003 |
| JP | 2002-101126 | 4/2002 |
| KR | 2003-058028 | 7/2003 |

OTHER PUBLICATIONS

Chinese Office Action issued in corresponding Chinese Patent Application No. 200410002614, dated Mar. 30, 2007.

* cited by examiner

- ● PE
- ◎ ITR
- ○ CR
- •••• LSP

SYSTEM FOR ENSURING QUALITY OF SERVICE IN A VIRTUAL PRIVATE NETWORK AND METHOD THEREOF

FIELD OF THE INVENTION

The present invention relates to a QoS implementing solution in a virtual private network, particularly to a QoS implementing solution in a virtual private network using multi-protocol label switch.

BACKGROUND OF THE INVENTION

Virtual Private Networking (abbreviated as "VPN") refers to establish a private network in a public network, so that the data can be transmitted via a secure "encrypted channel" in the public network. The respective branches of an enterprise can transfer information to each other once they access Internet locally via leased local private data lines; in addition, the enterprise can also enable its users to dial up to Internet and then access the Intranet by means of Internet dial-up access devices. The VPN has advantages of reduced cost, remote access support, high extension, easy management and overall control, etc.

Multi-Protocol Label Switch (abbreviated as "MPLS") is a standard protocol of Internet Engineering Task Force (abbreviated as "IETF"), evolved from CISCO's Tag Switching. MPLS is a label-based Internet Protocol (abbreviated as "IP") routing method and belongs to L3 switching technique. It introduced a label-based mechanism to separate routing from forwarding; that is, the route of a packet in the network is determined by the label, and data transmission is accomplished via a Label Switch Path (abbreviated as "LSP"). MPLS converts L3 packet switching in an IP network into L2 packet switching. The label includes a 3-bit EXP field to implement QoS.

Figure 1:
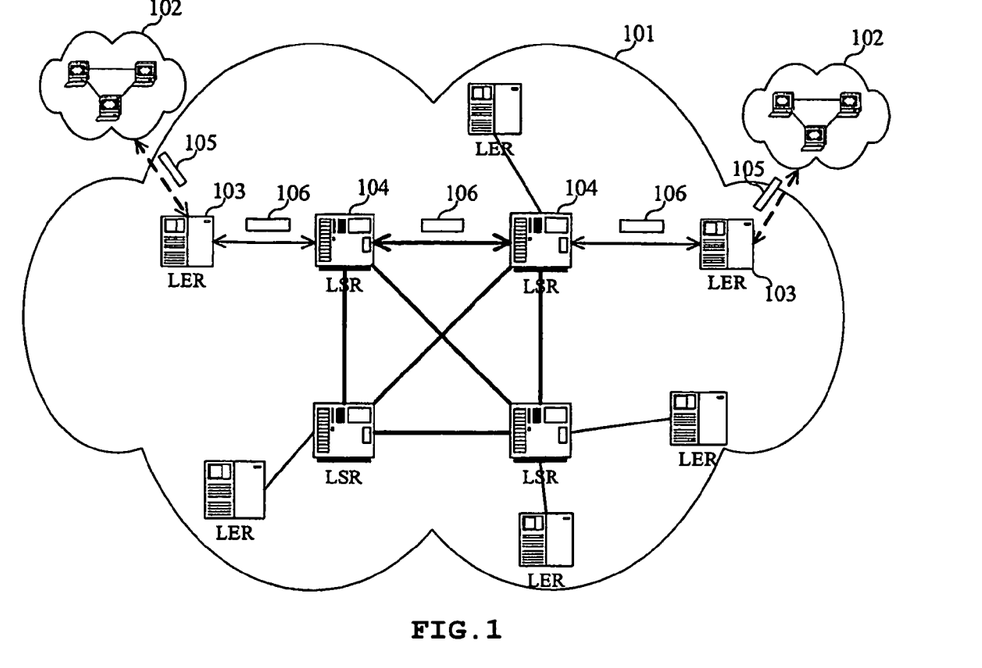
FIG. 1 is a schematic diagram of an MPLS network architecture.

FIG. 1 shows the structure of a MPLS network. As shown in FIG. 1, the MPLS network 101 includes Label Switch Routers (abbreviated as "LSR") 104 in the core part and Label Edge Routers (abbreviated as "LER") 103 in the edge part. Wherein, LERs 103 are designed to analyze IP packet headers, execute L3 network function, determine corresponding transmission class and Label Switch Path (abbreviated as "LSP"), and the LERs 103 are connected with external networks 102 and receive external packed switched data packets (IP packets) 105 from the external networks 102; the LSRs 104 are designed to establish LSPs, execute label switching mechanism and Quality of Service (QoS), and forward packed data packets (IP packets) 106 within the MPLS network, and each LSR 104 includes a control unit and a switching unit, located in the network, and is connected with LERs 103 and other LSRs 104.

The label switching work flow of MPLS is as follows: initially, a routing table and a label mapping table are created in LSR through Label Distribution Protocol (abbreviated as "LDP") and conventional routing protocols, e.g., Open Shortest Path First (OSPF) protocol, etc; during network operation, first, the LER at the ingress of the MPLS core network receives IP packets from an external network, accomplishes L3 network function, adds a label in the IP packet to form a packed data packet; next, the packed data packet is transmitted via a LSP, in this case, the LSR do not perform L3 process for the packed data packet but only forward the packed data packet in accordance with the label via the switching unit, so that the packed data packet arrives at a LER at the opposite end (i.e., egress) of the network; finally, the LER at the egress of the MPLS network removes the label from the packed data packet, and proceeds to forward through corresponding protocol of the external network.

Since MPLS technique isolates label distribution mechanism from data stream, it can be implemented independently to specific data link layer protocols, and thereby can support diverse physical layer and data link layer techniques. At present, MPLS-based services have been implemented in Frame Relay ("FR"), Asynchronous Transfer Mode ("ATM"), and Point-to-Point Protocol ("PPP") links, as well as local area network (LAN) that employs IEEE 802.3 protocol of Institute of Electrical and Electronics Engineers ("IEEE"). Employing a MPLS network for IP service forwarding can simplify the route forwarding procedures between layers, speed up MPLS switching, and improve network efficiency while meeting the requirements for services transmission of different grades; therefore, MPLS incorporates high speed flow control capability of switch and flexible functionality and QoS assurance mechanism of router.

MPLS has been widely used in implementation of VPNs. A VPN implemented on the basis of MPLS is referred to as a MPLS VPN.

MPLS VPNs can be classified into L3 (i.e., network layer) VPN, L2 (i.e., data link layer) VPN, L1 (i.e., physical layer) VPN, depending on the subscriber information that is used for forwarding by the network equipment. Presently, in the members of INTERNET ENGINEERING TASK FORCE (abbreviated as "IETF"), there are an L3 VPN workgroup and an L2 VPN workgroup, which study MPLS L3 VPN and MPLS L2 VPN, respectively. Typical examples of MPLS L3 VPN include Border Gateway Protocol ("BGP") /MPLS VPN based on RFC 2547bis and IP VPN based on Virtual Router ("VR"). Typical examples of MPLS L2 VPNs include MARTINI, KOMPELLA, and implementing solutions of various Virtual Private LAN Segments (abbreviated as "VPLS"). Furthermore, SG 13/Q11 of International Telecommunication Union Telecommunication Standardization Sector (abbreviated as "ITU-T") made a lot of investigations on L1 VPN, and presently, there are draft proposals such as Y.11vpnarch and Y.11vpnsdr, etc. Their reference models are similar in structure and VPN QoS processing, i.e., they don't take consideration of VPN QoS or utilize DiffServ capability of the network itself; therefore, above solutions can't solve the VPN QoS problem due to the same reason. In this respect, they can be concluded as the same technique.

Hereinafter the prior arts are described with RFC 2547bis as an example of this kind of techniques. Since they have the same reference model structures as L2 VPN and L3 VPN of ITU-T and IETF, they face the same challenge regarding QoS processing.

Figure 2:
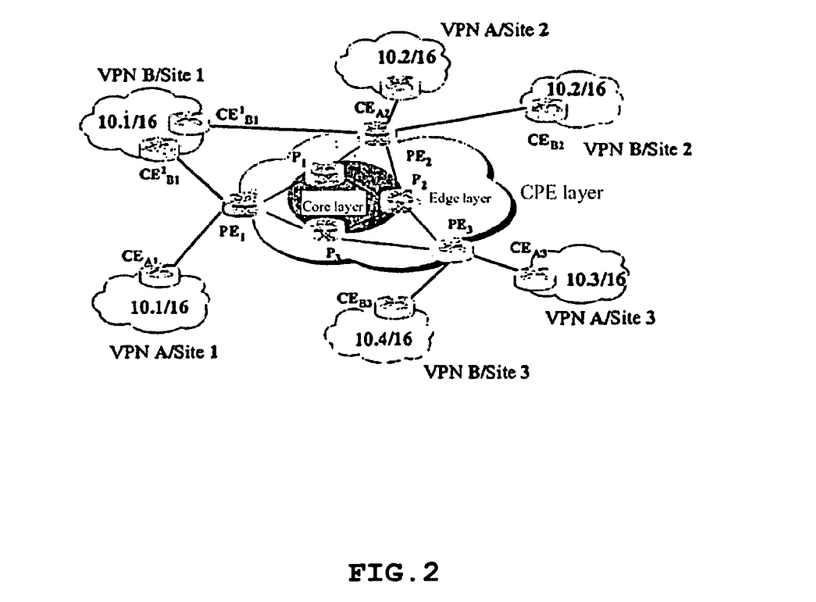
FIG. 2 shows the MPLS L3 VPN model defined in RFC 2547bis.

The MPLS L3 VPN model defined in RFC 2547bis is shown in FIG. 2. The model includes three components: Custom Edge Routers (abbreviated as "CEs"), Provider Edge Routers (abbreviated as "PEs"), and routers (P).

As a component of the customer premise network, a CE has an interface, usually a router, directly connected to the operator's network. CE can't "sense" existence of VPN and needn't to maintain the routing information of the entire VPN.

A PE is the operator's edge router. It is an edge device of the operator's network (also referred to as "backbone network"), and is directly connected to CEs. In an MPLS network, all processing work on VPN is accomplished in PEs.

As a backbone router in the operator's network, the router (P) is not connected directly with CEs. The router (P) shall have basic MPLS signaling capability and forwarding capability.

CEs and PEs are classified mainly in accordance with the administrative domains of the operator and subscribers; CEs and PEs form the boundary between the administrative domains.

CEs exchange routing information with PEs through Exterior Border Gateway Protocol (abbreviated as "EBGP") or Interior Gateway Protocol (abbreviated as "IGP") or via static routes.

It is unnecessary for CEs to support MPLS or sense the routes across the entire VPN; the routes across the entire VPN are contracted out to the operator for implementation. PEs exchange routing information across the entire VPN through Multi-Protocol Internal Border Gateway Protocol (abbreviated as "MP-IBGP").

Hereinafter the attributes of MPLS L3 VPN specified in RFC 2547bis are described:

VRF:

A VPN includes multiple sites. In PE, each site corresponds to a VPN Routing/Forwarding (abbreviated as "VRF") instance which mainly includes: IP routing table, label forwarding table, a cluster of interfaces that use the label forwarding table, and management information (including Route Distinguisher, route filtering policy, and member interface list, etc.)

A site can belong to multiple VPNs at the same time. In the implementation, each site has at least one separate VRF. Actually, the VRF(s) at a site in VPN combines the VPN membership and routing rules of the site. The message forwarding information is stored in the IP routing table and label forwarding table in each VRF. The system maintains a set of independent routing table and label forwarding table for each VRF, so as to prevent data leakage from the VPN and prevent external data from entering into the VPN.

VPN-IPv4 Address Family:

VPN routes are distributed among PEs in BGP, and a new address family of VPN-IPv4 address family is used.

A VPN-IPv4 address includes 12 bytes; wherein, the first 8 bytes refer to Route Distinguisher (abbreviated as "RD"), the rest 4 bytes refer to IPv4 address. PE identifies routing information from different VPNs by RD. The operator can allocate RDs independently, but has to take the ID of the dedicated Autonomous System (abbreviated as "AS") as a part of RDs to ensure global uniqueness of each RD. A VPN-IPv4 address with RD=0 is synonymous to a globally unique IPv4 address. As such, even there is repetition in the 4-byte IPv4 address portion in VPN-IPv4 addresses, the VPN-IPv4 addresses are still globally unique.

The routes received by PE from CE are IPv4 routes, which shall be imported into the VRF routing table, attached with a RD at that moment. In common practice, the same RD is set for all routes from the same subscriber site.

Route Target Attribute:

Route Target attribute identifies the collection of sites where a route can be used, i.e., the sites where the route can be received, in other words, the sites from which the routes can be received by the PE. All PEs connected with the sites indicated in the Route Target will receive routes with such an attribute. After PE receives a route with such an attribute, it adds the route into the corresponding routing table.

There are two collections of Route Target attribute in PE: one is used to be attached to the routes received from a certain site, and is referred to as Export Route Targets; the other is used to decide which routes can be imported into the routing table of the site, and is referred to as Import Route Targets.

Through matching the Route Target attribute carried with the routes, the VPN membership can be obtained. Route Target attribute matching operation can be used to filter the routing information received by PE.

VPN Message Forwarding Process:

In RFC 2547bis standard, VPN message forwarding employs two layers of labels. The first layer (outer layer) label is exchanged in the backbone network, and represents an LSP from a PE to the opposite PE; with the label, a VPN message can reach the opposite PE along the LSP. When the message is transmitted from the opposite PE to a CE, the second layer (inner layer) label is used; the inner layer label indicates the destination site of the message, more specifically, the destination CE. In this way, in accordance with the inner layer label, the interface for message forwarding can be found. In special cases, if two sites belonging to the same VPN are connected to the same PE, there is no problem about how to reach the opposite PE, what is to be solved is how to reach the opposite CE.

Distribute VPN Routing Information in BGP:

In RFC 2547bis standard, CEs and PEs transmit routing information to each other in IGP or EBGP; PEs obtain the routing table of the VPN, and store it in a separate VRF. General IP connectivity between PEs is ensured in IGP, VPN composition information and routing information is transmitted in IBGP, and VRFs are updated accordingly. The routing tables in CEs are updated through route switching between PEs and CEs, and thereby the route switching between CEs is accomplished.

BGP communication is carried out on two layers: inside the autonomous systems (IBGP) and between the autonomous systems (EBGP). PE-PE sessions are IBGP sessions; while PE-CE sessions are EBGP sessions.

The transmission of VPN composition information and routing information between PEs in BGP is accomplished in Multiprotocol Extensions BGP (abbreviated as "MBGP"). Details of MBGP are described in IETF RFC 2283 "Multiprotocol Extensions for BGP-4". MBGP is downward compatible, i.e., it supports both conventional IPv4 address family and other address families (e.g., VPN-IPv4 address family). With the route target carried in MBGP, the routes of a specific VPN can be known by only other members of the VPN, so that it becomes possible for the communication between BGP/MPLS VPN members.

In data transmission via a VPN, the subscriber often designates the QoS, for example, priority of the data to be transmitted. The higher the priority of the data to be transmitted is, the sooner the VPN will transmit the data on the premise of ensured transmission reliability. In practical situations, there is no matured MPLS VPN QoS solution at present. As a result, the subscribers' requirements can't be met.

The main reason for above situation is: different NBVPNs accessed by the same group of PEs share resources with each other by multiplexing outer layer labels in the MPLS label stack.

Theoretically, though the resources of outer layer tunnels can be ensured by providing DiffServ-aware (perform forwarding in different priorities by DiffServ Code point (DSCP) field) or with similar solutions. In these reference models, none of the devices in each VPN knows resource condition in the backbone network, moreover, there is a resource competition between several VPNs at each node, therefore it is a difficult task to ensure resources for each VPN. Such a sharing and competition mechanism brings more complexity to QoS assurance for VPNs.

The Provider Provisioned Virtual Private Networks (abbreviated as "PPVPN") workgroup designated by IETF is divided into two workgroups after the Vienna Seminar held in July, 2003: L2 VPN and L3 VPN workgroups. In their latest charters, no QoS solution was included. In the prior VPN reference models, the QoS problem still exists. In IETF's "draft-martini-12circuit-trans-mpls-10.txt" and "draft-martini-12circuit-encap-rapls-04.txt" (both of them are the foundation of L2 VPN), the representation for QoS problem was "QoS related issues are not discussed in this draft". In "draft-IETF-L3VPN-rfc2547bis-01.txt" (it is the foundation of BGP/MPLS VPN), the representation for QoS problem was simply mentioned: "existing L3 QoS capabilities can be applied to labeled packets through the use of the 'experimental' bits in the shim header". However, the problem is, L3 QoS itself is a complex and unsolved problem. Therefore, the QoS problem in L2 VPN/L3 VPN is left unsolved.

On the ITU-T SG13 Seminar held in July, 2003, the proposal for investigation of generalized VPN (GVPN) "Y.nb-vpn-decomp" was approved as the initial documentation for generalized Network Based Virtual Private Network (abbreviated as "NBVPN") as well as the foundation for classification of building blocks of GVPN. In "Y.nbvpn-decomp", some functional entities were classified, aiming to simplify VPN problems, so as to define the techniques and mechanisms required by network operators to provide expected VPN networks. However, the reference model provided in "Y.nbvpn-decomp" and corresponding QoS problems are identical to the VPN reference model and QoS problems put forth by IETF. Therefore, the QoS problems have not been solved satisfactorily; as a result, the entire VPN model is not generalized enough to meet the requirements of operators who expect to provide QoS assured VPN services. Furthermore, though VPN subscribers are permitted to access the VPN, it is uninsured that they can obtain required resources as in Asynchronous Transfer Mode (abbreviated as "ATM") / Frame Relay (abbreviated as "FR") /Digital Data Network (abbreviated as "DDN") networks.

SUMMARY OF THE INVENTION

An aspect of the present invention provides a system for ensuring quality of service in a virtual private network in network-based VPN, including:

a logical bearer network, which is formed by connecting label switch paths configured with preserving bandwidth to routers over a basic IP network with multi-protocol label switch, and is dedicated to transmit service data with quality of service requirement; and a bearer control network, which is used to maintain the logical bearer network and route the service data.

Preferably, the bearer control network includes centralized resource controllers for managing network resources in the logical bearer network, maintaining network topology of the logical bearer network, perform resource calculation and route selection, sending route indications to the routers, allocating resources and performing access control in the logical bearer network, and maintaining membership information and connectivity information for the virtual private network, so as to implement automatic detection and unilateral configuration of the membership.

Preferably, one centralized resource controller is provided in each domain of the logical bearer network; the centralized resource controllers are connected with each other to exchange topology and resource information of the logical bearer network and routing information of the virtual private network.

Preferably, the logical bearer network and the bearer control network distribute routes for the virtual private network, maintain membership for the virtual private network, and maintain connectivity between sites in the virtual private network in an out-of-band mode.

Preferably, the routers include: provider edge routers, intermediate transfer routers, and core routers; wherein the provider edge routers are used to identify the virtual private network with quality of service requirement, encapsulate service data with quality of service requirement entering into the virtual private network with label stack designated by the centralized resource controller, set the quality of service field of all labels in the label stack in accordance with the service priority, and transmit encapsulated service data packets via the logical bearer network;

the intermediate transfer routers are used to implement static or dynamic configuration of label switch paths, DiffServ-aware multi-protocol label switch, and stream processing by type of service;

the core routers are used to implement DiffServ-aware multi-protocol label switch and stream processing by type of service.

Preferably, the centralized resource controller includes an interface management module, a protocol processing module, a membership maintenance module, a topology and resource management module, a route management module, and an automatic signaling detection module; wherein the interface management module is used to implement and manage the communication interface between the virtual private network and an external device;

the protocol processing module is used to process the protocols for communication between the centralized resource controller and an external device, and forward the data to the membership maintenance module, topology and resource management module, route management module, and automatic signaling detection module in accordance with the protocol; the protocol processing module receives/sends data via the interface management module;

the membership maintenance module is used to maintain the membership information of the virtual private network and connectivity information between sites of the virtual private network;

the topology and resource management module is used to manage the topological relationship and resources of the logical bearer network;

the route management module is used to manage the routing relation of the virtual private network; and the automatic signaling detection module is used to detect changes automatically, and notify the membership maintenance module and the topology and resource management module to correct the corresponding information.

Another aspect of the present invention provides a method for ensuring quality of service in a network-based virtual private network, including the steps of:

A. in a basic IP network, constructing a logical bearer network dedicated to transmit service data with quality of service requirement by configuring label switch paths with preserved bandwidth with multi-protocol label switch technique;

B. providing a centralized resource controller to manage resources of the logical bearer network centrally;

C. if service data with quality of service requirement is to be transmitted, marking priority of the service in the quality of service field of the routing labels corresponding to the multi-protocol label switch data packets encapsulated from the service data stream, and transmitting the service data via the logical bearer network in accordance with the route allocated by the centralized resource controller.

Preferably, one centralized resource controller is provided in each domain of the logical bearer network.

Preferably, the route can be a serial label switch path determined by the label stack.

Preferably, in the step C, the quality of service field of all labels in the service route label stack is set as the same value.

The method further includes the step of:

adjusting the topology and resources of the logic bearer network dynamically with multi-protocol label switch traffic engineering technique.

Preferably, in the step C, the priority of the service is determined by type of the service.

Preferably, if the virtual private network includes sites with quality of service requirement and sites without quality of service requirement, the method further includes the step of:

determining whether both the service data sending sites and receiving sites have a quality of service requirement; if the both have, transmitting the service data with resources in the logical bearer network; otherwise transmitting the service data with other resources in the basic IP network.

Preferably, the step of determining whether both the service data sending sites and receiving sites have a quality of service requirement includes the sub-steps of:

E1. comparing the route targets of the sending sites and receiving sites, and determining whether the connectivity between the sending sites and receiving sites is a general connectivity; if yes, proceeding to step E2;

E2. comparing the route targets of the sending sites and receiving sites with quality of service requirement, determining whether the connectivity between the sending sites and receiving sites is a connectivity with quality of service requirement; if yes, determining the service between the sending sites and receiving sites has a quality of service requirement; otherwise determining the service between the sending sites and receiving sites has no quality of service requirement.

Preferably, the route allocated by the centralized resource controller to each pair of sites with quality of service requirement is unique.

In comparison, it can be seen that the difference of the technical solution between an embodiment of the present invention and the prior art lies in: by pre-configuring partial resources dedicatedly to the QoS-VPN (referred to as VPN-LBN) in the basic IP network with MPLS technique and adding centralized resource controllers in the conventional VPN reference model to maintain the network topology and resources of the VPN-LBN and membership information and connectivity information of each QoS-VPN, admission control and route calculation are implemented in accordance with the resource condition of the logical bearer network, and all accessed services can obtain expected QoS.

The difference in technical solution brings obvious advantageous effect, i.e., it solves the QoS problem in MPLS VPN, and provides driving force to operators to provide QoS-assured VPNs; it overcomes the challenges in complexity, planning-ability, manageability and operability of operation of large-scale VPNs and cross-domain operation of VPNs; it unifies the QoS solutions for MPLS L3/L2/L1 VPNs.

DETAILED DESCRIPTION OF THE EMBODIMENTS

Hereinafter embodiments of the present invention are described in detail with reference to the attached drawings.

Figure 3A:
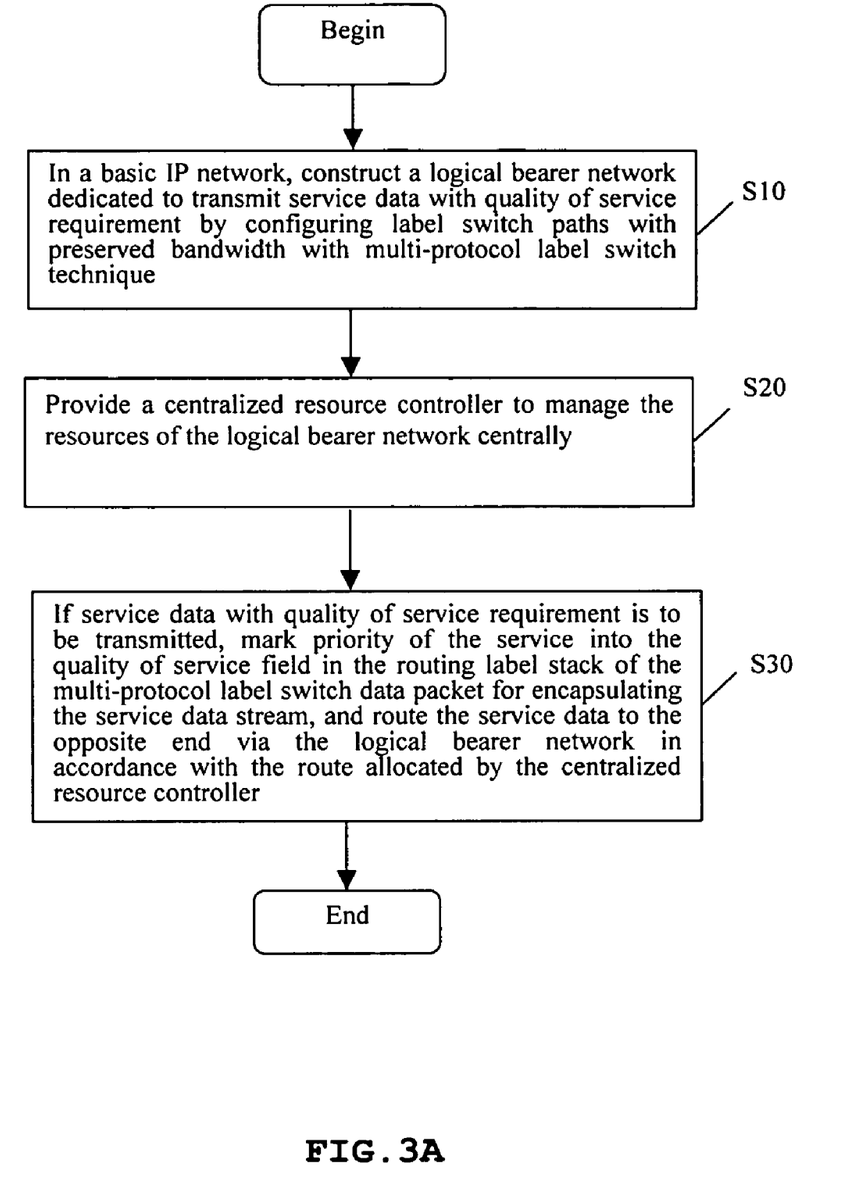
FIG. 3A is a flow chart of a method for ensuring quality of service in a VPN according to an embodiment of the present invention.

FIG. 3A is a flow chart of a method for ensuring quality of service in a VPN according to an embodiment of the present invention. The method includes the following steps of: first, in a basic IP network, constructing a logical bearer network dedicated to transmit service data with quality of service requirement by configuring label switch paths with preserved bandwidth with multi-protocol label switch technique (step S10); then, providing a centralized resource controller for managing resources of the logical bearer network centrally (step S20); finally, if service data with quality of service requirement is to be transmitted, marking priority of the service in the quality of service field of the routing label stack corresponding to the multi-protocol label switch data packets encapsulated from the service data stream, and routing the service data to the opposite end via the logical bearer network in accordance with the route allocated by the centralized resource controller (step S30).

According to an embodiment of the present invention, through pre-configuring partial resources dedicatedly to the QoS-VPN in the basic IP network with MPLS technique and configuring centralized resource controllers to maintain the network topology, resources of the VPN-LBN, membership information, and connectivity information, so that expected QoS can be ensured for all accessed services.

Hereinafter the detailed implementation procedures of the method are described with reference to an embodiment.

Figure 3B:
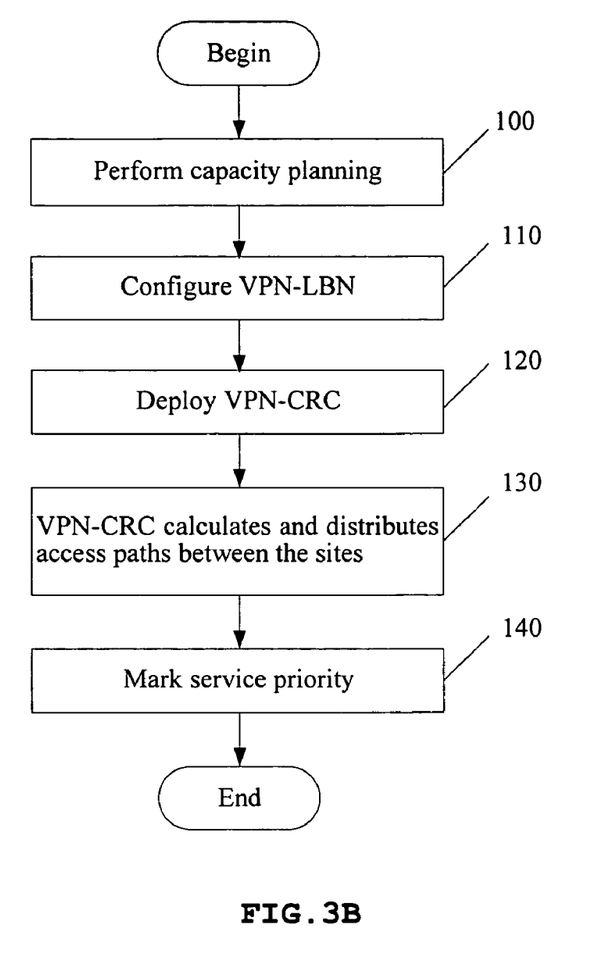
FIG. 3B is a flow chart of a method for implementing QoS-VPN according to an embodiment of the present invention.

FIG. 3B shows a flow chart of implementing above method. In step 100, the capacity planning is carried out: the services with QoS requirement in the Network Based Virtual Private Network (abbreviated as "NBVPN") are classified into a special service type (referred to as QoS-VPN service in the embodiment of the present invention, and this kind of NBVPN is referred to as QoS-VPN). The network operator shall be capable of identifying such services when accessing the same; the most straightforward method (of course, not limited to this method) is to enable the PEs at the sites in QoS-VPN to identify the interfaces or sub-interfaces connected to the sites and deem all incoming services from these interfaces or sub-interfaces are QoS-VPN services. The network operator shall make planning for the capacity for QoS-VPN services, including topology, route, and bandwidth, etc., in accordance with the current and anticipated QoS-VPN services.

Next, in step 110, the VPN-Logical Bearer Network (abbreviated as "LBN") is configured. In accordance with the result of capacity planning, an LBN is pre-configured dedicatedly for the QoS-VPN in the basic IP network with MPLS technique; for QoS-VPN traffic streams, the routing, resource allocation, admission control, and label forwarding are processed only in the VPN-LBN; VPN traffic streams without QoS requirement are routed and forwarded in accordance with the existing VPN mechanism and the resources that are not pre-configured in the basic network.

Next, in step 120, VPN-Centralized Resource Controllers (abbreviated as "CRC") are provided. A VPN-CRC is provided in each domain of the VPN-LBN and is usually separated from the data plane equipment in the VPN. The VPN-CRC is responsible for resource calculation, access control, resource allocation, and routing between sites of the VPN, distributing MPLS label stacks that represent the routes to ingress PEs, maintaining membership information and connectivity information for each QoS-VPN, and processing necessary signaling. The reason for providing a CRC in each domain is: if only one global CRC is provided, the information to be coordinated will be too huge in a large-scale network. Domains are logical areas allocated by the operator, for example, a domain may cover a province or city. The domain size can be determined by the actual processing capacity of the CRC.

In the embodiment, the topology and bandwidth of QoS-VPN are allocated statically. In another preferred embodiment of the present invention, the topology and bandwidth of VPN-LBN are adjusted dynamically with Traffic Engineering (abbreviated as "TE") technique, so as to implement LSP protection or capacity change.

Next, in step 130, the VPN-CRC calculates and distributes the access paths between the sites. Since the information of all available resources in VPN-LBN and membership and connectivity information of QoS-VPN are logged in the VPN-CRC, the VPN-CRC can calculate the access path for each pair of sites with QoS requirement and distribute the route to the PEs, and the PEs can take actions accordingly. In this way, the route between each pair of sites with QoS requirement is uniquely identified.

Next, in step 140, the service priority is marked, and the service data is transmitted via the VPN-LBN. In each QoS-VPN, though the route of all services between two sites is the same, the traffic streams can still be classified into different types, such as voice, video, and data services. The service types can be identified by the ingress PE and marked with corresponding priorities; when the ingress PE performs MPLS encapsulation for the data streams with different priorities, it maps the priorities to the EXP field in all labels in the label stack, which represents routing information and is distributed from the VPN-CRC to the ingress PE (since pop operation is carried out for all labels in the label stack when the labels are forwarded along these routes, the priority information of traffic streams can be kept, provided that the EXP field in all labels are identical). In this way, after VPN-CRC determines the route and bandwidth for services between two sites, different levels of services can be forwarded in MPLS-DiffServ mode, so as to meet the requirements for time delay, jitter/packet loss, etc., and ensure VPN QoS.

It is noted that a hybrid QoS-VPN can be divided into two parts: one part includes sites with QoS requirement, and the above mechanism can be applied to it; the other part includes sites without QoS requirement, and the prior VPN mechanism is applied to it. That is, when service data is received, it is required to determine whether both the service data sending sites and receiving sites have QoS requirements; if yes, the service data can be transmitted with the resources in the logical bearer network; otherwise the service data can be transmitted with other resources in the basic IP network. In addition, before the determination of whether both the service data sending sites and receiving sites have QoS requirements, the method includes the sub-steps of: comparing the route targets of the sending sites and receiving sites, determining whether the connectivity between the sending sites and receiving sites is a general connectivity, if yes, proceeding to the subsequent step; otherwise terminating the process.

Wherein, the step of determining whether both the service data sending sites and receiving sites have QoS requirements is performed in the following way: determining whether the sending sites and receiving sites have connectivity with QoS requirement by comparing the route targets of the sending sites and receiving sites; if yes, both the sending sites and receiving sites have QoS requirements; otherwise both the service data sending sites and receiving sites have no QoS requirements.

Hereinafter the overall framework of QoS-VPN is described with reference to FIG. 4.

In a preferred embodiment of the present invention, the QoS-VPN framework includes two layers: a logical bearer network (also referred to as "logical bearer layer") and a bearer control network (also referred to as "bearer control layer"). The logical bearer layer is formed by connecting PEs to CRs and ITRs via LSPs which are pre-configured with preserved bandwidth in accordance with the pre-defined capacity planning with MPLS technique.

The bearer control network includes several VPN-CRCs, and each domain is configured with a VPN-CRC (excluding VPN-CRC backups). The VPN-CRC manages the network resources (including bandwidth, processors, buffers) of VPN-LBN, maintains network topology of VPN-LBN, performs resource calculation and routing, sends route indications to PEs, allocates resources in VPN-LBN, performs access control, and maintains membership information table, connectivity information table, and relevant signaling for each QoS-VPN, so as to implement automatic membership detection and unilateral configuration.

Hereinafter the VPN-LBN division method is described.

In order to ensure reliable transmission in QoS-VPN, it is necessary to separate QoS-VPN services from Best Effort services (including VPN services without QoS requirement and general Internet services) in resource allocation and routing aspects. The resources of QoS-VPN are allocated in the pre-configured VPN-LBN, and the explicit routes are chosen by VPN-CRC; while the Best Effort VPN services are still routed and forwarded in the conventional VPN mechanism with the remaining unallocated network resources.

Figure 5:
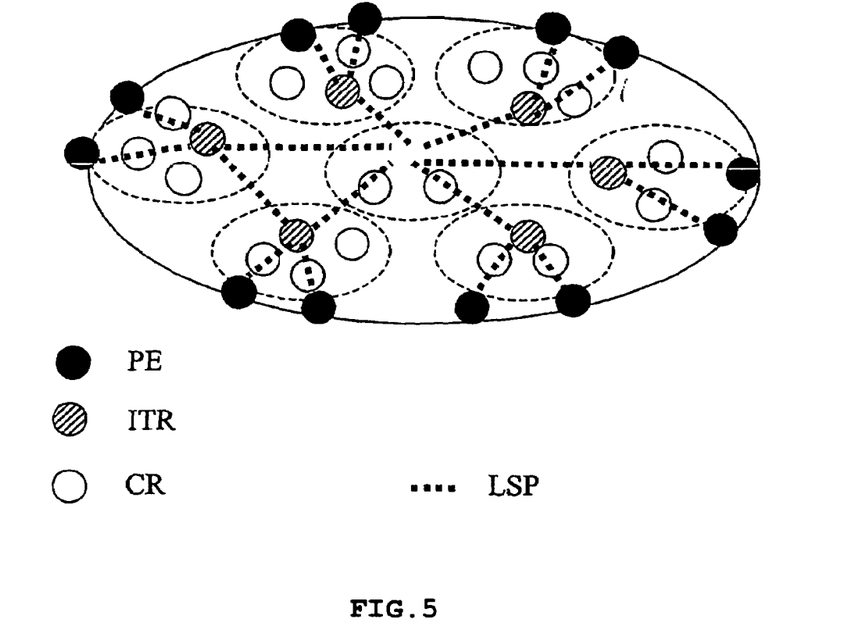
FIG. 5 shows an MPLS-based VPN-LBN according to an embodiment of the present invention.

As shown in FIG. 5, the VPN-LBN includes PEs, ITRs, CRs, and LSPs that connect these routers. Wherein, the LSPs can be configured statically or, configured dynamically in accordance with the capacity planning and flow measurement data.

In order to implement LSP protection or capacity change, MPLS TE techniques, such as Fast Reroute (abbreviated as "FRR"), can be used to adjust dynamically LSP bandwidth and maintain VPN-LBN topology.

When a service request from a local site to a remote site in QoS-VPN is transmitted via a PE to the VPN-CRC, the QoS requirement determined in accordance with the Service Level Agreement (abbreviated as "SLA") between the subscribers and the operator is also transmitted to the VPN-CRC along with the service request. The VPN-CRC determines whether to admit the access (if necessary, participation of other VPN-CRCs in the bearer control network is required); if it admits the access, the VPN-CRC will calculate the routes that can meet the QoS requirement and send the routing information (representing a set of serial LSPs from an ingress PE to an egress PE) to the ingress PE. The ingress PE logs the routing information, the corresponding QoS-VPN (by VPN-ID), and local and remote sites (by site ID); all services belonging to the QoS-VPN and from the local site to the remote site will be forwarded along the route, unless the ingress PE receives other route indications.

The ingress PE identifies the QoS-VPN by corresponding information (interface, sub-interface, etc.). When a QoS-VPN traffic stream enters into the network, the ingress PE obtains the stream description information (usually includes source address, source port, destination address, destination port, protocol type), encapsulates the packet/frame with the label stack indicated by VPN-CRC, sets different EXP bytes for all labels in the label stack for different data types (voice/video/data), and imports the data packet/frame into the VPN-LBN. When the data stream is transmitted via ITRs along the route, the DiffServ-aware MPLS technique is followed.

Hereinafter the most important device VPN-CRC in the embodiment of the present invention is described in detail.

The VPN bearer control network includes VPN-CRCs in the domains and is the control plane and management plane of the VPN bearer layer. In a preferred embodiment of the present invention, the VPN-CRC has the following functions: calculation of resources in the domain, routing, admission control, inter-domain resource request, maintenance of network topology, maintenance of membership information, maintenance and automatic detection of connectivity information, and unilateral configuration. Furthermore, VPN-CRC may support policy management, SLA management, LSP flow measurement, and interfacing to Authentication, Authorization, and Accounting Server (abbreviated as "AAA Server").

Figure 6:
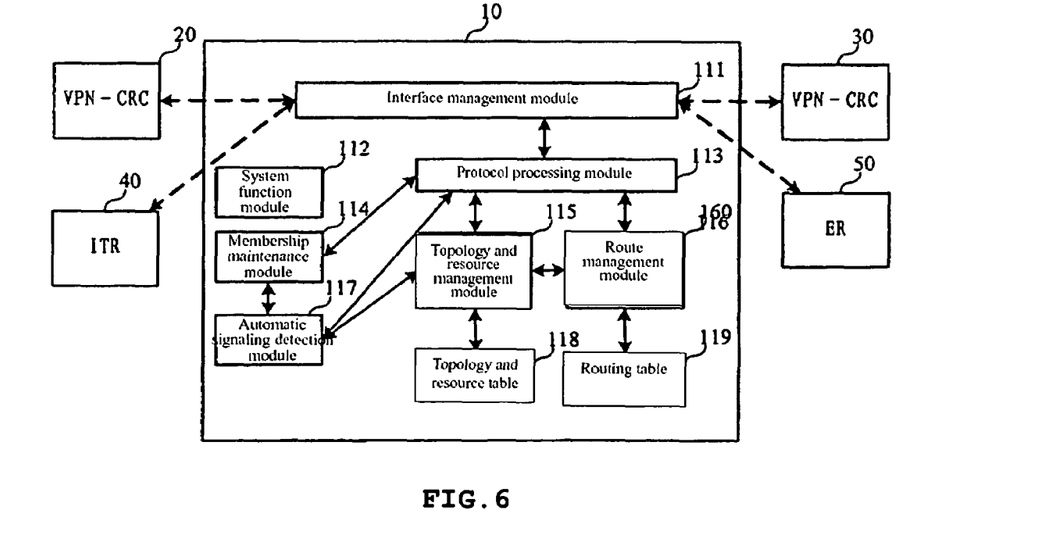
FIG. 6 is a schematic diagram of internal structure of VPN-CRC and external connectivity thereof according to an embodiment of the present invention.

The internal structure and external connectivity of VPN-CRC are shown in FIG. 6. VPN-CNC 10 mainly includes the following modules:

An interface management module 111 is used to implement and manage communication interfaces to external equipments, for example, communication with the upstream VPN-CRC 20, downstream VPN-CRC 30, ITR 40, and ER 50. The protocols used in the communication will be described hereinafter.

A system function module 112 is used to provide a substrate platform for normal operation of the entire VPN-CRC 10. In a preferred embodiment of the present invention, the system function module 112 is an operating system in the VPN-CRC 10.

A protocol processing module 113 is used to process protocols for communication between the VPN-CRC 10 and external equipments and forward the communication data to a membership maintenance module 114, a topology and resource management module 115, a route management module 116, and an automatic signaling detection module 117 as required by the protocol; wherein, the protocol processing module 113 sends/receives communication data via the interface management module 111.

The membership maintenance module 114 is used to maintain the membership information table and connectivity information table. The membership information table contains information of site members of the same QoS-VPN. The membership information table is a list of site IDs in the same QoS-VPN, and is indexed by VPN-ID. The connectivity information table contains connectivity between members of the same QoS-VPN, i.e., which sites can be accessed by a specific site. The connectivity information table can be obtained from the membership information table and Route Targets of each site; if the Export Route Target of a site is identical to the Import Route Target of another site in the same QoS-VPN, it means there is connectivity between the two sites. The VPN-CRC 10 will refer to the connectivity information table when performing admission control. Through accessing the connectivity information table, Mesh, Hub-Spoke, or any other topological relationship can be established among sites of the QoS-VPN.

The topology and resource management module 115 is used to manage the topological relationship and resources of the VPN-LBN. The topological relationship refers to the connectivity among the nodes in the VPN-LBN; the resources mainly refer to the bandwidth preserved for the connectivity. The recording and maintenance of topology and resources in VPN-LBN is independent to the basic network, and the initial resources in the VPN-LBN have to be configured manually in accordance with the capacity planning result.

The route management module 116, which is used to manage the routing relation for the QoS-VPN centrally.

The automatic signaling detection module 117 is used to detect changes automatically. The automatic detection means the connectivity information is provided by an external equipment (e.g., PE) automatically instead of configured in the VPN-CRC 10 manually. If the automatic signaling detection module 117 obtains changed membership or LBN topology, the automatic signaling detection module 117 will notify the membership maintenance module 114 or the topology and resource management module 115 to perform an update accordingly.

In order to maintain and transmit the connectivity information of QoS-VPN, the VPN-CRC has to maintain connectivity between QoS-VPN members, i.e., topology of QoS-VPN sites, which can be implemented (but not limited to) by logging two site lists of each QoS-VPN: one is the sending site list; the other is the receiving site list. In order to support automatic detection of changes in QoS-VPN membership and connectivity information, whenever a site is added to/deleted from the QoS-VPN, the relevant update message shall be transmitted between the PE and the VPN-CRC, and the VPN-CRC involved shall update the membership information table and the connectivity information table. With such a mechanism, unilateral configuration can be implemented, i.e., whenever a site is added to/deleted from the QoS-VPN or the connectivity between the sites changes, what has to do is to configure the PE for the site added/deleted or for the site where the connectivity has changed, so the configuration will trigger an update message, which will be transmitted automatically through relevant VPN-CRCs and PEs; when receiving the update message, the VPN-CRCs will update the corresponding QoS-VPN membership information table and connectivity information table.

When a site is added in the QoS-VPN, a service request (containing VPN-ID, local site ID, remote site ID, and QoS requirement) will be transmitted to the VPN-CRC of the current domain; the VPN-CRC will calculate resources (if necessary, participation of relevant VPN-CRCs is required) for the newly added site to access other sites; if the addition is permitted, the VPN-CRC will calculate the routes for the new site to access other sites, and indicate the routes to relevant PEs; the PEs will update their QoS-routing information tables; when a remote PE senses addition of a site, it will trigger its local sites to access the service request of the new site, and the VPN bearer control network will perform the same processing; finally, all sites will obtain the inter-access routing information.

When a site is deleted, the VPN-CRC will update the relevant membership information table and connectivity information table, release the resources related with the deleted site, and notify relevant PEs to delete relevant entries from their QoS routing information tables; when a remote PE senses deletion of a site, it will trigger its local sites to delete the resources involved in access to the deleted site.

A topology and resource table 118 is used to store the topological relationship and resources of the VPN-LBN.

A routing table 119 is used to store the routes of the QoS-VPN (substantively, a collection of accessible destination addresses of the sites). The collection of the destination addresses includes several address prefixes or addresses.

When the VPN-CRC receives a service request (containing VPN-ID, local site ID, remote site ID, and QoS requirement) from the ingress PE of the local domain or a resource request from another VPN-CRC, it will perform resource calculation, routing, and admission control (if necessary, transmit the resource request to the downstream VPN-CRC); if the resource calculation result of a certain VPN-CRC involved is "reject", the VPN-CRC has to transmit the response to upstream VPN-CRCs, till the response reaches to the ingress PE. Otherwise, the VPN-CRC will transmit the determined routing information to upstream VPN-CRCs, till the whole routing information (label stack) is sent to the ingress PE. When the ingress PE forwards the data from a local site to a remote site, it sets the EXP byte in all labels in the label stack in accordance with the descriptor of traffic stream from CE to PE; in this way, all service data from the local site to the remote site are transmitted along the route as calculated above; however, services of different types in the same direction will be distinguished by the EXP byte and transmitted in accordance with the MPLS-DiffServ mechanism.

Figure 4:
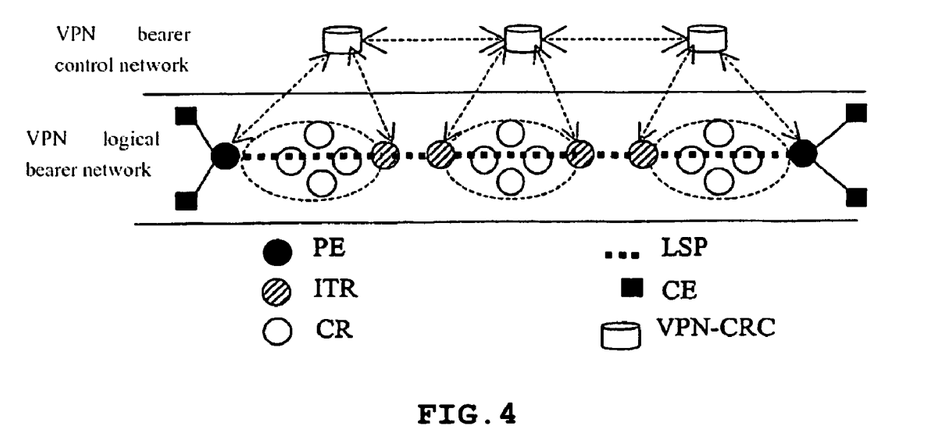
FIG. 4 is the reference model of the QoS-VPN architecture according to an embodiment of the present invention.

Hereinafter the requirements for functions of PEs, ITRs, and CRs on the VPN bearer layer as shown in FIG. 4 are described.

The PE shall support static LSP configuration or dynamic LSP setup in CR-LDP/RSVP-TE, so as to implement pre-configuration and dynamic VPN-LBN adjustment; furthermore, the PE shall support stream classification, so as to set an EXP byte for the label stack received from the VPN-CRC. The PE stores the QoS routing information table, which contains the following information: VPN-ID, local site ID, remote site IDs (the collection of destination address accessible in remote sites), and routes between the local site and remote sites.

When an admission control response is received from the VPN-CRC, if the response is "admit access", the route and QoS information will be included in the response, and the ingress PE will log the information in the QoS information table. The ingress PE maintains the information for each QoS-VPN. In accordance with the index of VPN-ID, the ingress PE logs an entry for each pair of sites (from a local site to a remote site) in the information of each QoS-VPN. The ingress PE performs queuing, scheduling, shaping, marking, policy-making, and MPLS encapsulation with reference to the QoS routing information table, and performs forwarding along the route determined in the label stack in the VPN-LBN.

The Intermediate Transfer Router (ITR) shall support static LSP configuration or dynamic LSP setup in CR-LDP/RSVP-TE, so as to implement pre-configuration and dynamic adjustment of VPN-LBN; furthermore, the ITR shall support DiffServ-ware MPLS and stream processing by type of service.

The Core Router (CR) in the IP backbone network shall support only DiffSerV-aware MPLS and stream processing by type of service.

Hereinafter the method of isolation between QoS-VPNs by means of VPN address is described.

A VPN address may include a globally unique VPN-ID in the VPN-LBN and private L3/L2/L1 VPN addresses, for example, IPv4/IPv6/IPx address in L3 VPN, data link address in L2 VPN, and cross link ID in L1 VPN; in such a VPN address solution, repetition is permitted in the site addresses in different QoS-VPNs. Since VPN-ID is globally unique in the VPN-LBN, the resultant VPN address is unique in the VPN-LBN.

With the QoS routing information table, information of different QoS-VPNs can be distinguished by VPN-ID, and thereby isolation between QoS-VPNs can be implemented.

Hereinafter the routing and forwarding method is described.

QoS-VPN routes are maintained in the QoS routing information table in PE, at a granularity of a site pair in QoS-VPN, i.e., the routes for all services from a local site to a remote site are identical. At the ingress PE, the route searching is performed in two stages: in the first stage, the home QoS-VPN of the local site is found in accordance with the VPN-ID as the index; in the second stage, the searching is oriented to the pair of local site and remote site in the QoS-VPN. What is associated with the remote site is an aggregated address in the remote site. When the destination address of the traffic stream matches the aggregated address associated with the remote site in the site pair, the searching is deemed as successful. If the two-stage searching is successful, the ingress PE will determine the routing information (the MPLS label stack specified by VPN-CRC) for the traffic stream, and mark the EXP byte in the routing information label. If either of the searching at two stages fails, the ingress PE can reject the traffic stream.

Based on MPLS technique, the QoS-VPN forwarding employs the label stack issued by the VPN-CRC and the EXP byte set by the ingress PE for the traffic stream, and also employs MPLS-DiffServ mechanism in accordance with the outer layer label, so as to ensure service bandwidth and forwarding priority, and thereby QoS (bandwidth, time delay, jitter, packet loss rate) of the QoS-VPN.

Hereinafter the requirement for interfaces and signaling between devices is described, including the interfaces and protocols between PE and CE, between VPN-CRC and the provider's routers (including PE, ITR, CR), and between VPN-CRCs.

The interface between PE and CE is used to transmit subscriber information, such as topology, aggregated private address (e.g., private IPv4/IPv6/IPx address in L3 VPN, data link address in L2 VPN, or cross link ID in L1 VPN) of the site connected to CE, and service request (including stream ID).

The interface between VPN-CRC and PE enables the VPN-CRC to instruct the PE to process traffic streams of each site. It is necessary to define a corresponding protocol for the interface, for example, the protocol may be implemented by extending COPS in the structure described herein.

The protocol shall support the following functions:

(1) The ingress PE sends a service request (containing VPN-ID, local site ID, export Route Target, remote site ID, and QoS requirement) to the VPN-CRC. Wherein, the QoS requirement includes service type and the corresponding bandwidth, priority, time delay, jitter limit, packet loss rate, MTU, etc. The QoS requirement for a site may be determined by the SLA between the subscriber and the operator.

(2) The VPN-CRC determines whether there is connectivity between the local site and the remote site in accordance with the site IDs and export Route Target contained in the service request (the VPN-CRC has to transmit the service request message to the corresponding VPN-CRC and the egress PE); if there is connectivity, the VPN-CRC will notify the result to the ingress PC, regardless of whether the admission control result from the VPN bearer control network is "reject" or "admit".

(3) If the admission control result is "admit", the VPN-CRC notifies the ingress PE of the route (a label stack representing a set of serial LSPs) associated with the site pair. The PE creates a record in the QoS routing information table for each site pair in each QoS-VPN.

(4) When a site is added to/deleted from the QoS-VPN or the connectivity between sites changes, the PE corresponding to the site where the change happened shall send an update message to the VPN-CRC of the domain. The VPN-CRC transmits the message to the adjacent VPN-CRC and ultimately to the PE at opposite end; the corresponding VPN-CRCs will update their membership information tables and connectivity information tables, and the corresponding PEs will update the corresponding entries in the QoS routing information tables.

(5) The PE sends the aggregated VPN address information of the site connected to it to the VPN-CRC, then the VPN-CRC issues the information in the VPN bearer control network and ultimately to corresponding PEs. This function can be implemented by extending the prior BGP protocol. Finally, all PEs store the aggregated VPN addresses of QoS-VPN sites connected to them in the QoS routing information tables, so that when a PE receives a traffic stream, it can determine the route and EXP byte in accordance with the QoS routing information table and the stream ID.

Furthermore, the interface between VPN-CRC and PE, ITR, or CE in the domain shall support the following functions:

(1) It shall enable the VPN-CRC to configure each type of service with MPLS Diffserv PHB;

(2) It shall enable such routers as PE, ITR or CR to report LSP status to the VPN-CRC (i.e., in case a link or router fails, the router shall report to the VPN-CRC of the domain); the VPN-CRC issues the failure information in the VPN bearer control network, so that the VPN-CRCs will recalculate resources for the reserved routes. If there is any route to be updated, the VPN-CRC shall send the new route to the corresponding ingress PE.

The interface between VPN-CRCs is used to implement resource allocation and routing for services between QoS-VPN sites across domains.

It is necessary to define a separate protocol for the interface by extending COPS or BGP.

The protocol shall support the following functions:

(1) It shall permit the VPN-CRCs to request to the downstream VPN-CRC for allocating bearer resources for services between QoS-VPNs across domains.

(2) It shall permit VPN-CRCs to notify the inter-domain QoS-VPN service identification information (local site ID, remote site ID, VPN-ID) to the downstream VPN-CRC.

(3) It shall permit VPN-CRCs to notify the QoS requirement of inter-domain QoS-VPN services (including service type and bandwidth, priority, time delay limit, jitter limit, packet loss rate limit, etc.) to the downstream VPN-CRC.

(4) It shall permit VPN-CRCs to request the adjacent VPN to release the bearer resources allocated for services between QoS-VPNs across domains.

(5) It shall permit VPN-CRCs to query other VPN-CRCs for the status of resource allocation for services between QoS-VPNs across domains.

(6) It shall permit VPN-CRCs to notify query responses to other VPN-CRCs.

(7) It shall permit VPN-CRCs to exchange service level specification (abbreviated as "SLS") and routing information with other VPN-CRCs.

Hereinafter the case of hybrid QoS-VPNs is described.

In some cases, some sites in the VPN have QoS requirement while others don't have; such a VPN is called a hybrid QoS-VPN. A hybrid QoS-VPN includes two parts: one part includes sites with QoS requirement, and is called sub-QoS-VPN; the other part includes sites without QoS requirement, and is called sub-VPN. For sub-QoS-VPN, above MPLS NBVPN scheme that ensures QoS by centralized resource control can be used for QoS assurance; for sub-VPN, the QoS assurance can be implemented as instructed in relevant RFCs and drafts of IETF L3 VPN/L2 VPN workgroups. Route Target is used to determine the connectivity in the VPN (including sub-QoS-VPN and sub-VPN) by VPN-CRCs; in addition, QoS Route Target is introduced to maintain the connectivity information table of sub-QoS-VPN; QoS Route Targets are in the same format as Route Targets. After Route Target is compared to determine the general connectivity between the sites, QoS Route Target has to be compared (if the service request from either of the two sites exists); if the comparison succeeds, it means the service between the two sites has QoS requirement, and both of the sites belong to the sub-QoS-VPN; otherwise the two sites shall be included in the sub-VPN.

Hereinafter in-domain and inter-domain QoS-VPNs are described.

In-domain QoS-VPN routing and inter-domain routing are the foundation of resource management and admission control.

VPN-CRC performs in-domain routing with the topology information table and resource information table; the routing algorithm may be static (e.g., Time Dependent Routing ("TDR")/State Dependent Routing ("SDR")). Furthermore, VPN-CPC shall maintain an inter-domain routing table, so as to determine inter-domain LSPs in QoS signaling protocol and find the adjacent downstream VPN-CRC.

The inter-domain routing table in VPN-CRC can be configured manually or created automatically in a dynamic routing protocol.

Hereinafter the approach of providing QoS-VPN across network providers is discussed.

To support QoS-VPN across different provider's networks, the Autonomous System Boundary Routers ("ASBRs") shall communicate with each other to transmit VPN service request signaling and VPN services. If VPN-CRCs are provided in both networks and can communicate to each other, the VPN-CRCs only exchange and map inter-network SLAs; here, the VPN-CRCs only manage internal link resources, while the ASBRs manage inter-network link resources as specified in the SLAs and implement ingress PE functions that are available in the case of internal QoS-VPN; if either of the network is not provided with VPN-CRC and another QoS mechanism is employed, the two ASBRs shall map the QoS requirement to each other, and the final QoS assurance level will depend on the VPN QoS implement mechanism of the other network provider.

Though the present invention is illustrated and described with reference to some preferred embodiments, those skilled in the art shall understand that diverse modifications can be made in forms and details to the present invention, without departing from the spirit and scope of the present invention that are defined by the attached claims.

What is claimed is:

1. A system for ensuring quality of service in a virtual private network, comprising:
   a logical bearer network, which is formed by connecting label switch paths configured with preserving bandwidth to routers over a basic IP network with multiprotocol label switch, and is dedicated to transmit service data with quality of service requirement; and
   a bearer control network to maintain the logical bearer network and determine whether both a service data receiving site and a service data sending site have a quality of service requirement, wherein, if both the service data receiving and sending sites have the quality of service requirement, the bearer control network allocates route for the service, marks priority of the service in the quality of service field of route label corresponding to multi-protocol label switch data packets encapsulated from the service data stream, and routes the service data to opposite end via the logical bearer network in accordance with the allocated route;

wherein the bearer control network comprises: centralized resource controllers for:

determining whether a connectivity between the receiving and sending sites is a connectivity with quality of service requirement by comparing route targets of the receiving and sending sites;

determining the service between the sending sites and receiving sites has a quality of service requirement if the connectivity between the receiving and sending sites is a connectivity with quality of service requirement;

otherwise determining the service between the receiving and sending sites has no quality of service requirement.

2. The system for ensuring quality of service in a virtual private network according to claim 1, wherein the centralized resource controllers are further adapted for managing network resources in the logical bearer network, maintaining network topology of the logical bearer network, performing resource calculation and traffic route selection, sending traffic route indications to the routers, allocating resources and performing access control in the logical bearer network, and maintaining membership information and connectivity information for the virtual private network to implement automatic detection and unilateral configuration of the membership.

3. The system for ensuring quality of service in a virtual private network according to claim 2, wherein each domain of the logical bearer network is provided with one centralized resource controller; the centralized resource controllers are connected with each other, to exchange topology and resource information of the logical bearer network and routing information of the virtual private network.

4. The system for ensuring quality of service in a virtual private network according to claim 2, wherein the routers comprise: provider edge routers, intermediate transfer routers, and core routers; wherein the provider edge routers are used to identify the virtual private network with quality of service requirement, encapsulate service data with quality of service requirement entering from the virtual private network with label stack designated by the centralized resource controller, set quality of service field of all labels in the label stack in accordance with the service priority, and transmits encapsulated service data packets via the logical bearer network;

the intermediate transfer routers are used to implement static or dynamic configuration of label switch paths, DiffServ-aware multi-protocol label switch, and stream processing by type of service;

the core routers are used to implement DiffServ-aware multi-protocol label switch and stream processing by type of service.

5. The system for ensuring quality of service in a virtual private network according to claim 2, wherein the centralized resource controller comprises an interface management module, a protocol processing module, a membership maintenance module, a topology and resource management module, a route management module, and an automatic signaling detection module; wherein the interface management module is used to implement and manage the communication interface between the virtual private network and an external device;

the protocol processing module is used to process protocols for communication between the centralized resource controller and an external device, and forward the data to the membership maintenance module, topology and resource management module, route management module, and automatic signaling detection module in accordance with the protocol; the protocol processing module receives/sends data via the interface management module;

the membership maintenance module is used to maintain the membership information of the virtual private network and connectivity information between sites of the virtual private network;

the topology and resource management module is used to manage the topological relationship and resources of the logical bearer network;

the route management module is used to manage the routing relation of the virtual private network; and the automatic signaling detection module is used to detect changes automatically, and notify the membership maintenance module and the topology and resource management module to correct information corresponding to the changes.

6. The system for ensuring quality of service in a virtual private network according to claim 1, wherein the logical bearer network and the bearer control network distribute routes for the virtual private network, maintain membership for the virtual private network, and maintain connectivity between sites in the virtual private network in an out-of-band mode.

7. A method for ensuring quality of service in a virtual private network, comprising the steps of:

A. in a basic IP network, constructing a logical bearer network dedicated to transmit service data with quality of service requirement by configuring label switch paths with preserved bandwidth with multi-protocol label switch;

B. providing a centralized resource controller to centrally manage resources of the logical bearer network;

C. determining whether both a service data receiving site and a service data sending site have a quality of service requirement; and D. if both the service data receiving and sending sites have the quality of service requirement, marking priority of the service in the quality of service field of the routing labels corresponding to the multi-protocol label switch data packets encapsulated from the service data stream, and routing the service data to the opposite end via the logical bearer network in accordance with the route allocated by the centralized resource controller;

wherein the step of determining whether both the service data receiving and sending sites have a quality of service requirement is performed in the following way:

determining whether the connectivity between the receiving and sending sites is a connectivity with quality of service requirement by comparing the route targets of the receiving and sending sites;

if yes, determining the service between the sending sites and receiving sites has a quality of service requirement;

otherwise determining the service between the receiving and sending sites has no quality of service requirement.

8. The method for ensuring quality of service in a virtual private network according to claim 7, further comprising the following step between step B and step C: the centralized resource controller calculating access paths between the sites and issuing the access paths between the sites to the routers of virtual private network, so that the routers can store the routes allocated by the centralized resource controller.

9. The method for ensuring quality of service in a virtual private network according to claim 7, wherein the route is a serial label switch path determined by the label stack.

10. The method for ensuring quality of service in a virtual private network according to claim 7, wherein in the step C, the quality of service field of all labels in the service route label stack is set as the same value.

11. The method for ensuring quality of service in a virtual private network according to claim 7, further comprising the step of: adjusting the topology and resources of the logic bearer network dynamically with multi-protocol label switch traffic engineering.

12. The method for ensuring quality of service in a virtual private network according to claim 7, wherein in the step C, the priority of the service is determined by type of the service.

13. The method for ensuring quality of service in a virtual private network according to claim 7, further comprising the steps of:

if both the service data receiving and sending sites have no quality of service requirement, transmitting the service data with other resources in the basic IP network.

14. The method for ensuring quality of service in a virtual private network according to claim 7, further comprising the following step before the step of determining whether both the service data sending sites and receiving sites have a quality of service requirement:

comparing the route targets of the sending sites and receiving sites, and determining whether the connectivity between the sending sites and receiving sites is a general connectivity;

if so, proceeding to the next step; otherwise terminating the process.

15. The method for ensuring quality of service in a virtual private network according to claim 7, wherein the route allocated by the centralized resource controller to each pair of sites with quality of service requirement is unique.

* * * * *

UNITED STATES PATENT AND TRADEMARK OFFICE
CERTIFICATE OF CORRECTION

PATENT NO. : 7,650,637 B2  Page 1 of 1
APPLICATION NO. : 10/586604
DATED : January 19, 2010
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 452 days.

Signed and Sealed this

Twenty-third Day of November, 2010

David J. Kappos
*Director of the United States Patent and Trademark Office*